LINE CONCENTRATOR SYSTEM FOR STEP-BY-STEP OFFICES

Filed May 3, 1963 10 Sheets-Sheet 1

INVENTORS C. E. BROOKS
G. B. CROFUTT, JR.
W. C. SAND
BY S E Hollander
ATTORNEY

LINE CONCENTRATOR SYSTEM FOR STEP-BY-STEP OFFICES

Filed May 3, 1963 10 Sheets-Sheet 2

LINE CONCENTRATOR SYSTEM FOR STEP-BY-STEP OFFICES

Filed May 3, 1963 10 Sheets-Sheet 3

Aug. 30, 1966 C. E. BROOKS ETAL 3,270,140

LINE CONCENTRATOR SYSTEM FOR STEP-BY-STEP OFFICES

Filed May 3, 1963 10 Sheets-Sheet 4

LINE CONCENTRATOR SYSTEM FOR STEP-BY-STEP OFFICES

Filed May 3, 1963 10 Sheets-Sheet 5

Aug. 30, 1966 C. E. BROOKS ETAL 3,270,140

LINE CONCENTRATOR SYSTEM FOR STEP-BY-STEP OFFICES

Filed May 3, 1963 10 Sheets-Sheet 7

Aug. 30, 1966 C. E. BROOKS ETAL 3,270,140

LINE CONCENTRATOR SYSTEM FOR STEP-BY-STEP OFFICES

Filed May 3, 1963 10 Sheets-Sheet 8

LINE CONCENTRATOR SYSTEM FOR STEP-BY-STEP OFFICES

United States Patent Office 3,270,140
Patented August 30, 1966

3,270,140

LINE CONCENTRATOR SYSTEM FOR STEP-BY-STEP OFFICES

Chester E. Brooks, Montvale, George B. Crofutt, Jr., Verona, and William C. Sand, Chatham, N.J., assignors to Bell Telephone Laboratories, Incorporated, New York, N.Y., a corporation of New York Filed May 3, 1963, Ser. No. 277,926
15 Claims. (Cl. 179—18)

This invention relates to telephone lines concentrators and more particularly to telephone line concentrators for use in combination with step-by-step telephone switching systems.

Telephone line concentration has been generally directed toward efforts to reduce copper and other outside plant costs by literally "concentrating" a group of subscriber lines at a remote location or locations and extending these lines to the central office over a lesser number of trunks which are then shared as required.

Line concentrators may be divided in two general categories, i.e., "special purpose" and "universal." A universal line concentrator is applicable to most conventional type telephone switching systems without modification or invasion of the existing central office switching equipment—hence the term "universal." On gross examination, a universal line concentrator resembles two triangular networks joined at the apices by concentrator trunks. One of the triangular networks is remotely located and has connected to the base thereof the subscriber stations which are to be concentrated. The other triangular network is in the central office and, in effect, represents an expanding network since it has connected to the base thereof a number of central office line terminations equal in number to the number of remotely concentrated lines. Since each line termination in the office is unique to a concentrated line, the switching system functions to establish a connection through both the remote network and the central office switching network between a concentrated line and its corresponding line termination in the central office. Thereafter, since the central office does not "know" that it is dealing with a concentrated line rather than a direct connected line, all subsequent switching operations are conventional.

Operation of special-purpose line concentrators is similar so far as concentration at the remote network is concerned but departs from the universal concentrator arrangement in that no expansion network is provided at the central office and instead the concentrator trunks are extended to trunk links in the central office. Since this obviously requires substantial modification of the central office equipment, such concentrators are usually designed for particular telephone switching systems—hence the term "special purpose."

Although universal and special-purpose line concentrators are completely operative and useful, a number of disadvantages reside in the practice of making a concentrator either exclusively "universal" or exclusively "special purpose" in nature. Thus, in a universal type concentrator system, for example, considerable intelligence must be included in the concentrator control circuitry to relieve the central office equipment of any responsibility other than that of processing a call in a routine manner. In certain instances a judicious balance of economic considerations would dictate that although the concentrating system is substantially universal in nature, a modest degree of modification of existing central office equipment would substantially reduce the complexity of the equipment required in the concentrator control circuit. However, to the extent that the central office equipment is modified or "invaded" then, to that extent, the concentrator is assuming special-purpose characteristics.

It is therefore an object of this invention to provide a concentrating system which includes desirable aspects of both universal and special-purpose concentrator systems.

An additional object of this invention is to provide for the reduction in complexity of control equipment in the line concentrator system by inexpensive structural departures in the conventional telephone central office equipment.

Although certain prior concentrating systems were adapted to operate advantageously with step-by-step telephone systems, a number of these concentrators were predicated on the universal approach to line concentration by means of which an entire concentrator arrangement could be engrafted on a step-by-step telephone office without internal modification of the office itself.

A number of disadvantages derive from this type of operation. Included among these are the fact that a particular trunk utilized in a speech connection is, in effect, an extension of a particular calling line. In consequence, on an originating call, for example, an arrangement must be made for extending in the office a connection between the trunk and the conventional central office line termination to which the line would have been connected if it were directly connected to the office. This requires a complete re-expansion switching network which is capable of providing a connection between the concentrator trunks and the conventional central office line terminals. Since the over-all purpose of line concentration is in effect to reduce the costs of connecting a particular line to the office, the expenses associated with the switching network in the office are to that extent defeative since they are obviously not required in conventional telephone systems.

It is therefore an additional object of this invention to provide a hybrid line concentrator system which includes both universal and special-purpose aspects for use in conjunction with a step-by-step telephone system.

Still another object of this invention is to provide a concentrator arrangement for step-by-step offices which obviates the need for a switching network at the office for re-expansion of the concentrated lines.

Certain prior art line concentrators were characterized by the requirement of extending each line to a centralized remote switching unit at which the lines were terminated and connectable to the office over a smaller number of shared concentrator trunks. This arrangement, to the extent that it inexorably requires the extension of every concentrated line to the remote switching unit, is subject to the same difficulty which gives rise to line concentration in the first instance, namely, the inflexible requirement of connecting each line to the office. In our copending application, Serial No. 44,760, filed July 22, 1960, now Patent 3,115,550 of December 24, 1963, an arrangement is disclosed which overcomes this difficulty by decentralizing the remote switching equipment and distributing portions of the remote switching equipment adjacent to the individual subscriber substations.

A further object of this invention is to provide a line concentrator of the distributed type for use in conjunction with step-by-step telephone switching systems which obviates the need for deconcentrating or re-expansion switching equipment at the central office.

These and other objects and features of the invention are achieved in a system which includes a relatively larger number of substation lines which are concentrated by switching facilities at a remote location over a relatively smaller number of trunks which extend to a step-by-step telephone office. At the office the concentrator trunks in lieu of being delivered to the traditional deconcentrating switching stage necessary in certain universal concentrator systems are, through a departure in step-by-step concentrator philosophy, delivered directly to the concentrating or first switching stage of the telephone office. Thus, the concentrator trunks are extended on a one-for-one basis to the existing step-by-step line finders in the office. Through a relatively simple modification of existing step-by-step offices, a system is available which completely bypasses the necessity of deconcentration and yet provides substantially all of the advantages of universal concentrator systems.

To illustrate, on an originating call a line off-hook condition at a remote substation is transferred to the central office over a group of signal conductors which uniquely identify the calling substation. At the office the line identification is detected and the line relay, i.e., the existing conventional line relay in the central office unique to the calling substation line—the same relay which would have operated if the line were directly connected to the office—is operated. Since the step-by-step office merely recognizes the operation of the line relay in a conventional manner and is unaware of the fact that a concentrator call is involved (thus reinforcing the universality of the instant concentrator), it initiates a routine step-by-step operation in which a line finder is selected to "hunt" for the terminals of the calling line. When the line finder reaches the terminals unique to the calling substation line, it applies the traditional ground potential to the sleeve terminal of the calling line. It is essential to observe that since the substation line is, in fact, terminated at the remote switching unit and does not extend to the office, the line finder has merely seized a set of "blank" terminals corresponding to the calling line. However, since, as indicated above, the line finder is connected on a one-for-one basis to a concentrator trunk, a path now exists from the office over the line finder to the concentrator trunk which extends into the field. It merely remains to operate the remote switching unit to connect the remote substation line to the selected trunk coupled to the line finder. This operation is readily performed since the information relating to the calling line and to the selected trunk is available at the office as soon as the line finder (uniquely coupled to the selected trunk) seizes the "blank" line terminals (unique to the calling line).

Thus, marking potentials are applied over the selected trunk and over the signal conductors unique to the calling line to operate a remote crosspoint for coupling the remote substation to the selected trunk. Having done so, the remote substation is now metallically connected to the central office over a path including the remote substation, the remote crosspoints and the selected trunk to the line finder in the office. Thereafter, the calling line is provided wih dial tone by the first selector which is coupled to the line finder and dialing proceeds in a conventional manner. Subsequent switching operations in the office are likewise conventional.

The essential simplicity and yet versatility of the instant arrangement is further demonstrated when the procedure involved in a terminating call to a concentrator line is examined. Thus, it will be assumed that a distant substation is seeking to effect a calling connection to a concentrator line. The step-by-step office extends the connection from the calling subscriber in a traditional manner over a line finder, first selector and second selector in response to the dialed digits. The last two digits actuate a connector which seizes the existing terminals in the step-by-step office corresponding to the called concentrator line. As explained above, these terminals are, of course, "blank" since the concentrator line is terminated at the remote switching unit. However, through another simple modification, the traditional ground which is applied to the sleeve terminal of the called concentrator line is extended to operate the conventional line relay of the called line. Here again the operation of the line relay of a called line represents a simple and yet profound departure from conventional switching techniques (in which only the calling line relay is operated).

The operation of the line relay for the called concentrator line simulates to the step-by-step office an originating call on the called concentrator line. Since the line finder circuitry is unaware that the line relay has been operated as a result of a terminating call rather than an originating call, the conventional "hunting" operation is undertaken whereby a line finder hunts for and seizes the terminals of the called line. Here again it may be parenthetically noted that the use of a line finder to seize a called line is in sharp conflict with certain traditional step-by-step telephone switching procedures.

At this time both the connector and line finder have seized terminals corresponding to the called line. An interconnection between the connector and the line finder establishes a path to the called line over the concentrator trunk unique to the line finder. The remote switching unit is operated, as described above, for an originating call to effect a connection between the remote substation and the selected trunk. At this time a transmission path is now available from the called concentrator substation over the remote switching unit crosspoints, the concentrator trunk, the step-by-step line finder, the step-by-step connector and through the conventional switching train to the calling substation line.

Since the line finder is conventionally connected on a one-for-one basis to a first selector, the line finder in the above operation is arranged to be divorced from its corresponding first selector to prevent interference (by the application of dial tone to the called line, etc.) by separating the originating and terminating switching trains.

A feature of this invention includes the utilization of a step-by-step line finder on terminating calls.

Still another feature of this invention includes the operation of a line relay unique to a called line on a terminating call.

Still another feature of this invention includes arrangements for seizing terminals unique to a called concentrator line concurrently by a line finder and a connector.

Still another feature of this invention includes facilities for divorcing a first selector from its corresponding line finder.

These and other objects and features of the invention may be more readily apprehended from an examination of the following specification, appended claims and attached drawing in which:

FIGS. 1 and 2 show a block diagram of the concentrator combination with a step-by-step central office;

FIGS. 3–10 indicate the detailed structures of the equipment shown in outline form in FIGS. 1 and 2 wherein those structures have been added to or modified; and FIG. 11 depicts the arrangements of FIGS. 3–10 to disclose the invention.

*General description of originating call*

It will be assumed for purposes of illustration that a subscriber at substation 110 in FIG. 1 is originating a call to substation 210 in FIG. 2. When substation 110 goes off hook, a signal is delivered over the number group conductors unique to substation 110 to the central office. For purposes of illustration it will be assumed that number group conductors NG1–NG4 are unique to substation 110. In consequence, a detector circuit (not shown) in the control circuit of FIG. 1A, but shown in detail in FIG. 7, is responsive to the energization of the number group conductors to operate translation relays 7TRSL1–7TRSL4 as explained herein in detail. Operation of the latter relays identifies the substation line which is originating a call and extends a connection for the operation of a line relay in the conventional step-by-step central office equipment to operate the line relay 9L in FIG. 2 unique to substation 110. This path may be traced over the contacts of relays TRSL1–TRSL4, the No. 2 contacts of relay 9CO and the lower winding of relay 9L to negative battery. Operation of relay 9L results in the energization of a line finder circuit which has access to terminals unique to calling substation 110, i.e., the terminals to which substation 110 would have been connected if, in fact, directly connected to the central office. The line finder circuit 218 of FIG. 2 is energized in the conventional manner to seize the tip, ring, and sleeve conductors of the calling substation line terminals. In doing so, the line finder routinely applies a sleeve conductor ground potential to the sleeve terminal S which may thereafter be traced over the No. 2 contacts of relay 9L to the winding of relay 9CO and negative battery. Operation of relay 9CO results in the release of relay 9L and the extension of a ground potential over the sleeve conductor and diode 113 to the sleeve conductor of connector 217 thereby "busying" the line terminals on the connector for incoming calls. It will be noted that the line finder circuit is extended over conductors C, R, and T to trunk termination 120 and thereafter over the tip and ring terminals of trunk TK1 to line package 115 at which substation 110 is terminated.

At this time it is necessary to operate the cross-points 116 between the substation 110 and trunk TK1.

This operation is accomplished by applying marking potentials to the particular number group conductors NG1–NG4 unique to substation 110 and by applying a marking potential to the tip conductor of trunk TK1 as explained herein and in the above-referred-to application in detail. In consequence of doing so, a relay (not shown) is operated in line package 115 to close crosspoints 116. A circuit may now be traced from substation 110, contacts 116, tip and ring conductors of trunk TK1, tip and ring conductors of the trunk termination and cable 117 to the tip and ring conductors of the line finder circuit. In addition, a path is available over the No. 1 and No. 2 contacts of relay 5SCO1 and cable 119 to the tip and ring terminals of the first selector.

As in conventional practice the first selector provides dial tone to the calling substation over the path just traced and the subscriber at substation 110 may proceed to dial the digits of the called directory number in which event he is extended on a step-by-step basis through the first selector 219, second selector 220 and connector 221 to the called substation 210.

*General description of terminating call*

It will be assumed for purposes of illustration that the substation 210 in FIG. 2 is effecting a connection to substation 110 in FIG. 1. When the substation 210 goes off hook, a conventional line finder 213 "hunts" for the terminals of the calling line. When line finder 213 seizes the tip, ring, and sleeve terminals of the calling line, it automatically extends a connection to first selector 214 which conventionally supplies dial tone to the calling substation 210. At this time the subscriber at substation 210 may proceed to dial the digits of the called directory number representative of substation 110. In consequence, the first selector 214, the second selector 216 and the connector 217 are operated on a step-by-step basis to extend the connection to the terminals on connector 217 unique to the called substation 110. These tip and ring terminals are, of course, "blank" since substation 110 is terminated at the remote concentrator location and not connected directly to the office. A substation 110′ is shown in phantom outline to illustrate the manner in which substation 110 would have been connected, if directly connected to the office.

In order to effect a connection to the called substation, arrangements have been provided for extending the ground condition conventionally applied to the sleeve terminal of the called line in connector 217 over a path including sleeve conductor S, the No. 2 contacts of relay 9CO, lower winding of relay 9L to negative battery. Thus, the line relay 9L unique to the called substation line has been operated. Ordinarily this relay is only operated on originating calls as described above. However, the operation of relay 9L unique to substation 110, in effect, simulates a calling condition at the called station and thus summons line finder circuit 218 to hunt for the tip, ring, and sleeve terminals of the line corresponding to the called line. Ultimately the line finder circuit 218 seizes the tip, ring, and sleeve terminals of the called line in precisely the same manner described above for operation on an originating call.

However, when the line finder circuit seizes the terminals of the called line, a path may be traced from substation 210 through line finder 213, first selector 214, second selector 216, connector 217, line finder circuit 218, conductors T, R, and C of cable 117 to the trunk termination 120. The tip and ring conductors are thereafter extended over trunk TK1 to the remote location in the field and relay 5SCO1 is operated to divorce the line finder 218 from the first selector 219 as explained herein.

It is now necessary to operate the crosspoints 116 which couple substation 110 to trunk TK1. The marking operation through the application of appropriate potentials to the number group conductors NG1–NG4 and the tip and ring conductors of trunk TK1 is performed in the manner described above for an originating call.

For purposes of clarity only those aspects of the concentrator circuitry necessary for a complete understanding of the present invention have been described in detail. It is understood that a comprehensive description of the operation of a suitable applique circuit for use in combination with the instant invention is described in an application of C. E. Brooks and W. C. Sand, Serial No. 153,468, filed November 20, 1961, now Patent 3,198,887 of August 3, 1965. For a comprehensive description of the remote switching means shown in FIGS. 3 and 4 reference may be made to an application of C. E. Brooks, G. B. Crofutt, Jr., J. L. Henry and W. C. Sand, Serial No. 79,415, filed December 29, 1960, now Patent 3,123,674 of March 3, 1964.

Moreover, only those aspects of the step-by-step circuitry required for an understanding of the present invention are shown in detail in FIGS. 9 and 10. The remaining conventional equipment may be examined in detail in Patents 2,210,068 to T. L. Dimond of August 6, 1940, and 2,225,305 to G. V. King et al. of December 17, 1940. Moreover, a definite description of the operation of step-by-step equipment is given in the text entitled "Automatic Telephony" by Smith and Campbell, 2nd edition (1921).

*General description of major components*

Referring now to FIGS. 4–10 it is seen that the remote switching units individual to substations 41 and 43 include facilities for connecting each substation line (of which only two are shown although illustratively 200 may be utilized) to each one of twenty-five trunks of which only three are shown. Thus, by operating the appropriate magnetic reed crosspoints in the switching unit individual to substation 41, the tip and ring conductor of the substation line may be extended to the tip and ring conductors of the selected trunk TK–. Each switching unit includes a call start relay, for example relay 4CS, which is to the remote switching unit what a line relay is to a conventional central office switching system. Thus, relay 4CS responds on a line offhook condition at substation 41 to operate its reed contact. This in turn applies a current pulse to four number group conductors NG– unique to the calling line and which serve to identify the calling line. In this respect it will be noted that relay 4TFR executes a transfer function in connecting substation 41 either to the tip and ring conductors of the trunks or to the number group conductors.

In addition to the trunks TK1–TK25 which extend from the central office into the field, ten number group conductors NG1-NG10 (of which only five are shown) are utilized for control purposes. Moreover, a common return conductor MG and a hold conductor H are also utilized. Each of the substations is associated with the number group conductors in accordance with a code. At the central office applique circuit equipment connectable to the number group conductors and responsive to identify calling substations by detecting which number group conductors are energized is shown, including relays 7TRSL1–7TRSL10. Individual line appearances for each concentrator line are included on the intermediate distributing frame IDF of FIG. 9 although only three lines are shown for simplicity.

The conventional line relays (of which only relay 9L1 is shown) in the central office unique to each substation line are energized, as required, by a translation performed over the contacts of the number group detector relays 7TRSL1–7TRSL10.

A line finder 1001 uniquely connected to only one concentrator trunk TK1 is shown in FIG. 10. Moreover, the conventional connector circuits are shown in outline form in FIG. 9.

An additional translator for converting from central office equipment numbers to concentrator numbers for use in applying marking potentials to the trunks and the number group conductors is shown in FIG. 8. Thus, the line relay of each concentrator line in the central office is effective to operate a particular group of four gas tube diodes and triodes in FIG. 8 which in turn operate selected relays 8SUT– representative of the concentrator number. In FIG. 5 marking potentials may be applied to the number group conductors and the selected trunk conductors over the contacts of relay 8SUT–.

It is significant to observe in FIGS. 9 and 10 those facilities (conductors 41S, and S1) which provides for extending the sleeve conductor from the connector 909 to the line relay. As a result, when the connector extends a connection to the called line appearance in accordance with conventional practice, the ground condition thus applied is effective to operate the line relay unique to the called line thereby simulating for central office operation an originating call at the called line. In consequence, a line finder 1001 as shown in FIG. 10 "hunts" for the called line and seizes the line terminals on the line finder bank unique to the called line. At this time both the line finder and the connector are simultaneously coupled on a terminating call to extend a path from the calling line over the connector and the line finder to the trunk uniquely associated with the line finder which trunk extends to the remote switching unit unique to the calling line. Thereafter, the operation of the trunk relay 5TRK1 effects an application of marking potentials as described to the number group conductors unique to the called line and to the selected trunk to operate the remote switching means for coupling the called line to the selected trunk.

*Detailed description of originating call*

It will be assumed for purposes of illustration that the subscriber at substation 41 goes off hook to initiate a service request. In response to the closure of the switchhook contacts, a path is completed for the operation of the call start relay 4CS over a path which may be traced from the tip conductor of the substation, contacts of relay 4TFR, winding of relay 4CS, conductor 49, diodes 31–34, number group conductors NG1–NG4 to the central office. A corresponding path may be traced from the ring conductor of the substation loop, contacts of relay 4TFR, conductor 48 and the number group return conductor MG to ground at the central office. Relay 4CS is operated over this path and in turn applies a pulse through capacitor 42 over a path including ground at the central office, number group return conductor MG, conductor 48, contacts of relay 4CS, capacitor 42, conductor 49, diodes 31–34, number group conductors NG1–NG4, transistors 7TR1–7TR4 and the windings of relays 7TRSL1–7TRSL4 to negative battery.

Figure 8:
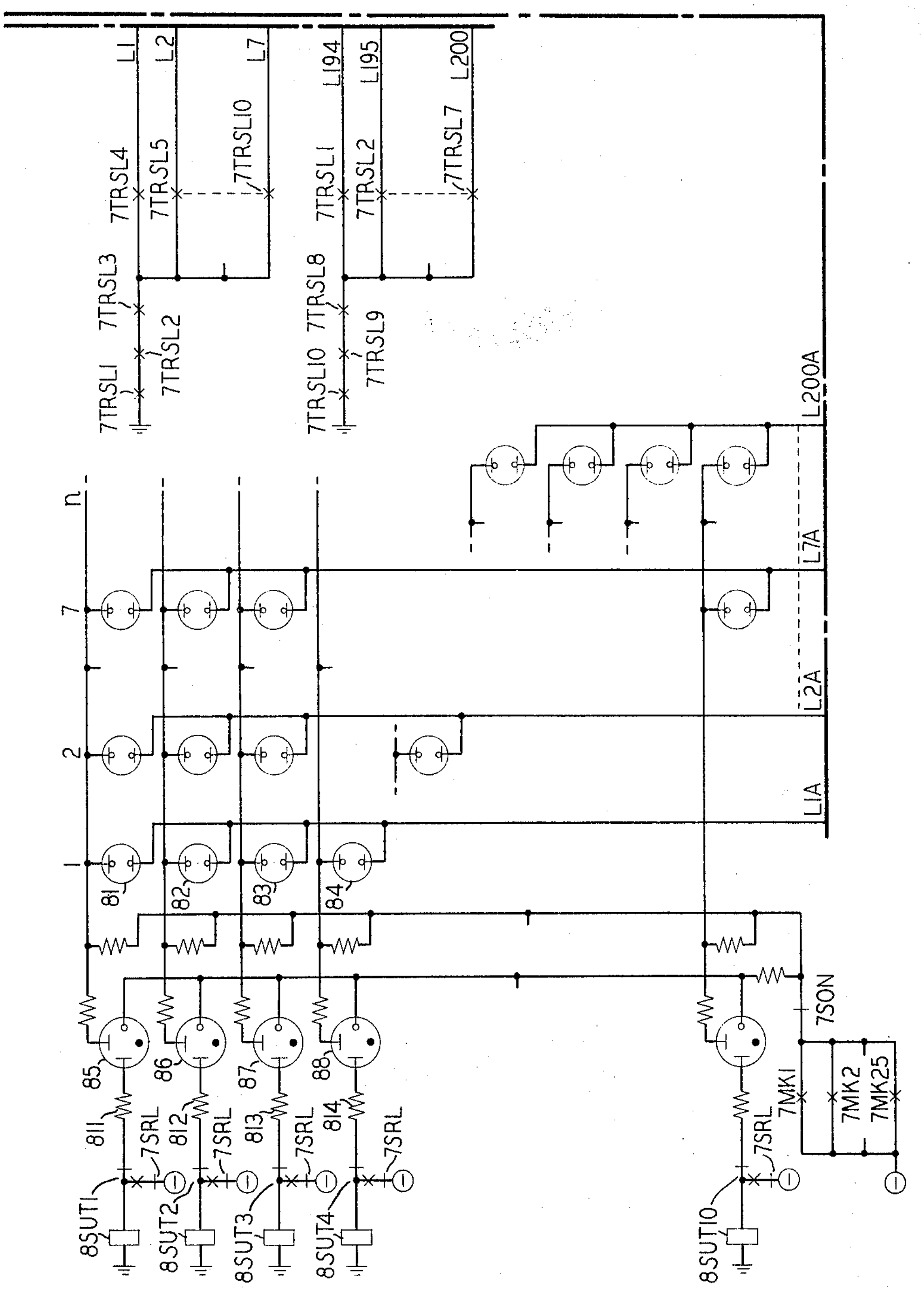

The operation of relays 7TRSL1–7TRSL4 uniquely identifies the calling substation at the central office. A translation is performed over the contacts of the operated relays 7TRSL– to operate the conventional existing line relay in the central office unique to the concentrator line originating the call, i.e., substation 41. Thus, a path may be traced in FIG. 8 over the contacts of relays 7TRSL1, 7TRSL2, 7TRSL3, and 7TRSL4, cable F, conductor L1, contacts of relay CO1, and winding of relay 9L1 in the conventional step-by-step line equipment at the central office. This results in the operation of line relay 9L1.

The step-by-step office proceeds in the routine manner to seize a line finder 1001 which in turn "hunts" for the terminals of the line originating the call. When the line finder in FIG. 10 steps to the terminals of the calling line, the ground condition which appears on the sleeve of the called line arrests further stepping of the line finder in a routine manner. At this time a trunk has been selected to serve the calling substation since each line finder is unique to a concentrator trunk. In this case the line finder 1001 of FIG. 10 is unique to trunk TK1.

It is necessary to complete a communication path to the originating substation to extend a connection over the trunk to the package individual to the calling line by operating the crosspoints between the substation and the selected trunk at the remote location. This is accomplished in a manner analogous to that described in the above-referred-to application of C. E. Brooks and W. C. Sand by performing a translation of the line number at the central office to, in effect, regenerate the concentrator number of the calling line. Thus, as a result of the release of relay 9L1, a path (for an inductive surge) may be traced from ground upper winding of relay 9L1, conductor L1A, cable H, conductor L1A, gas tubes 81–84 in parallel, gas tubes 85–88 in parallel, resistances 811–814 in parallel, contacts of relays 8SUT1–8SUT4, windings of relays 8SUT1–8SUT4 to ground. The latter relays, 8SUT1–8SUT4, are operated over this path and collectively represent the concentrator number of the calling line.

Figure 1:
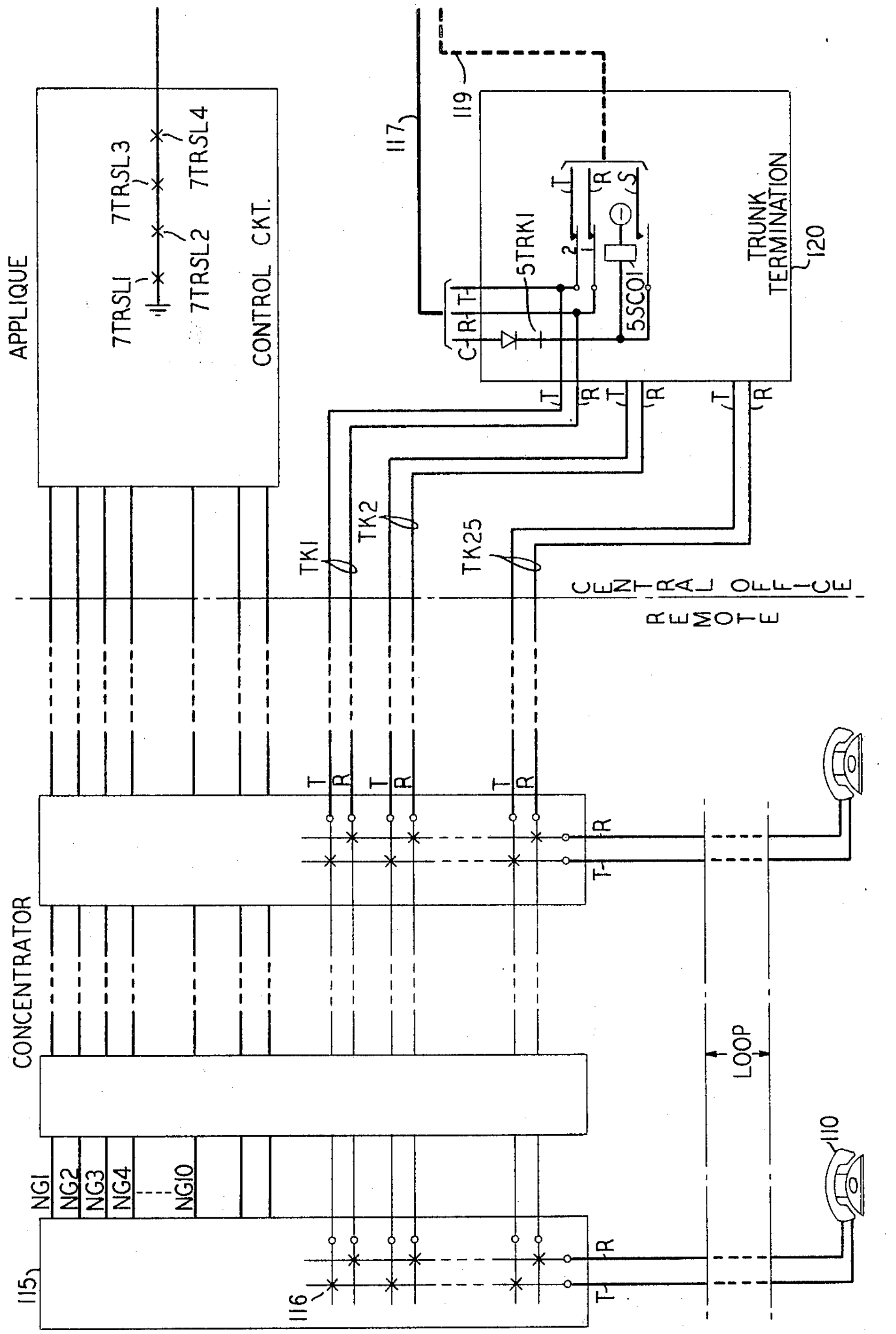
Figure 2:
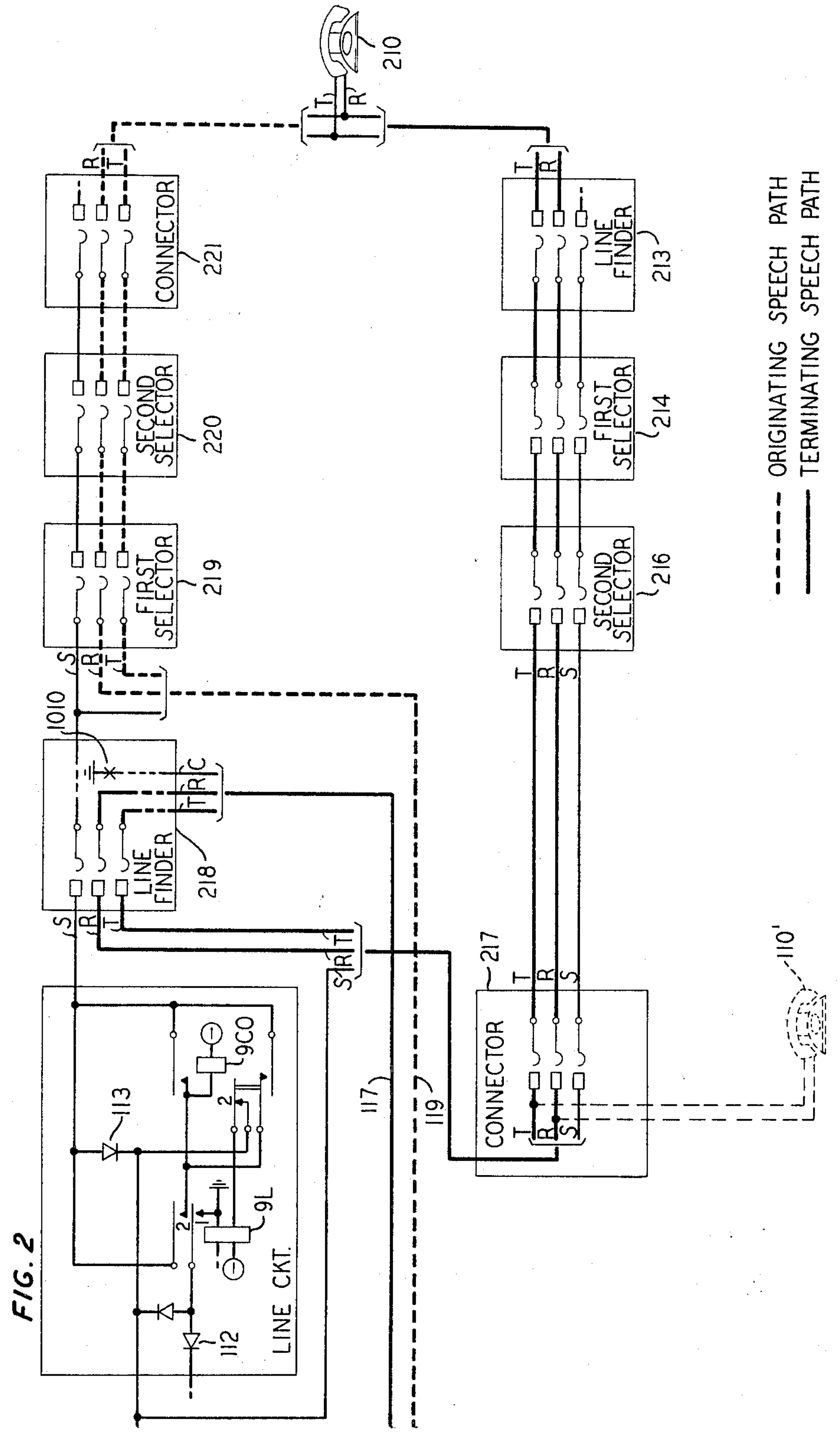
Figure 3:
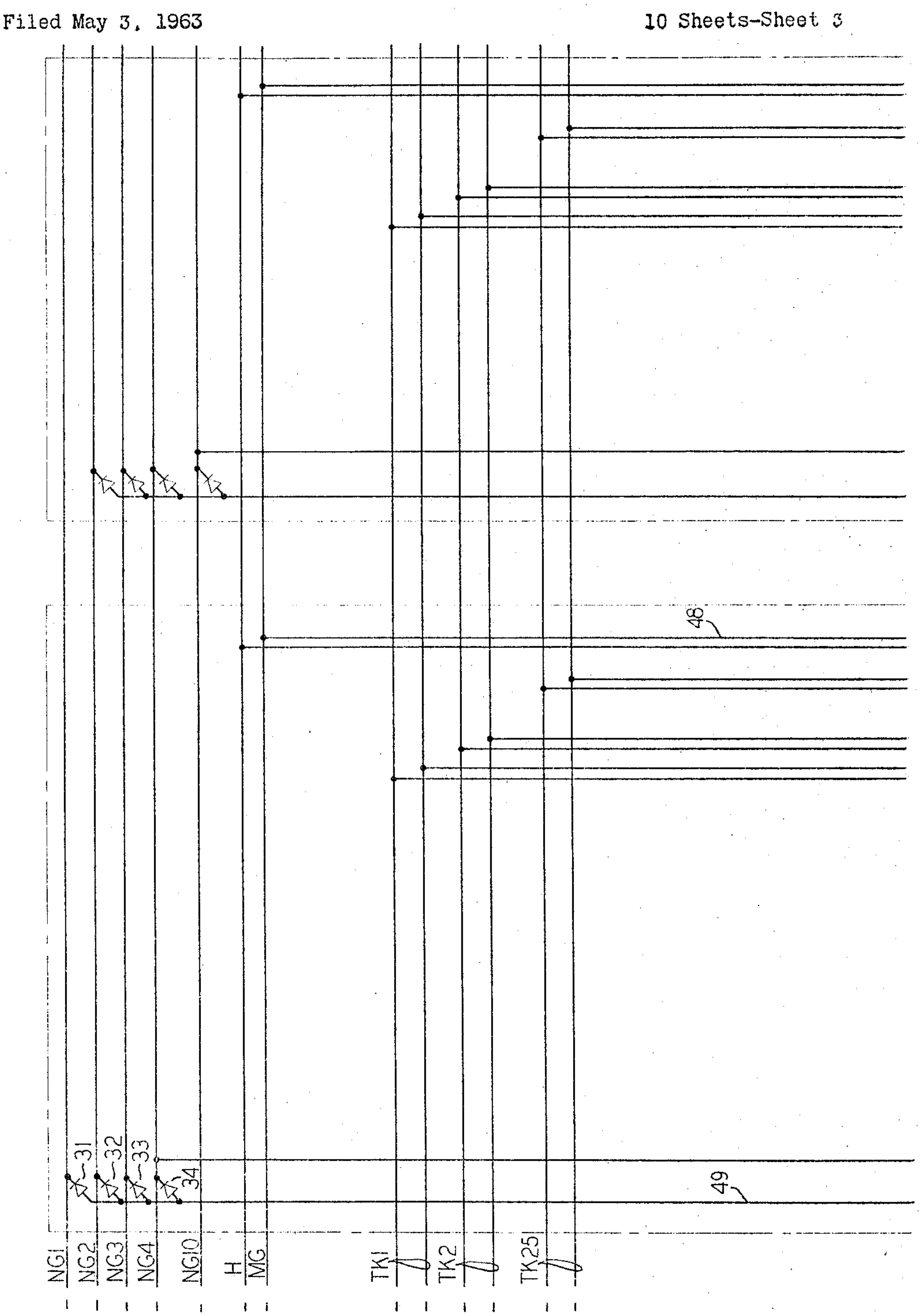
Figure 4:
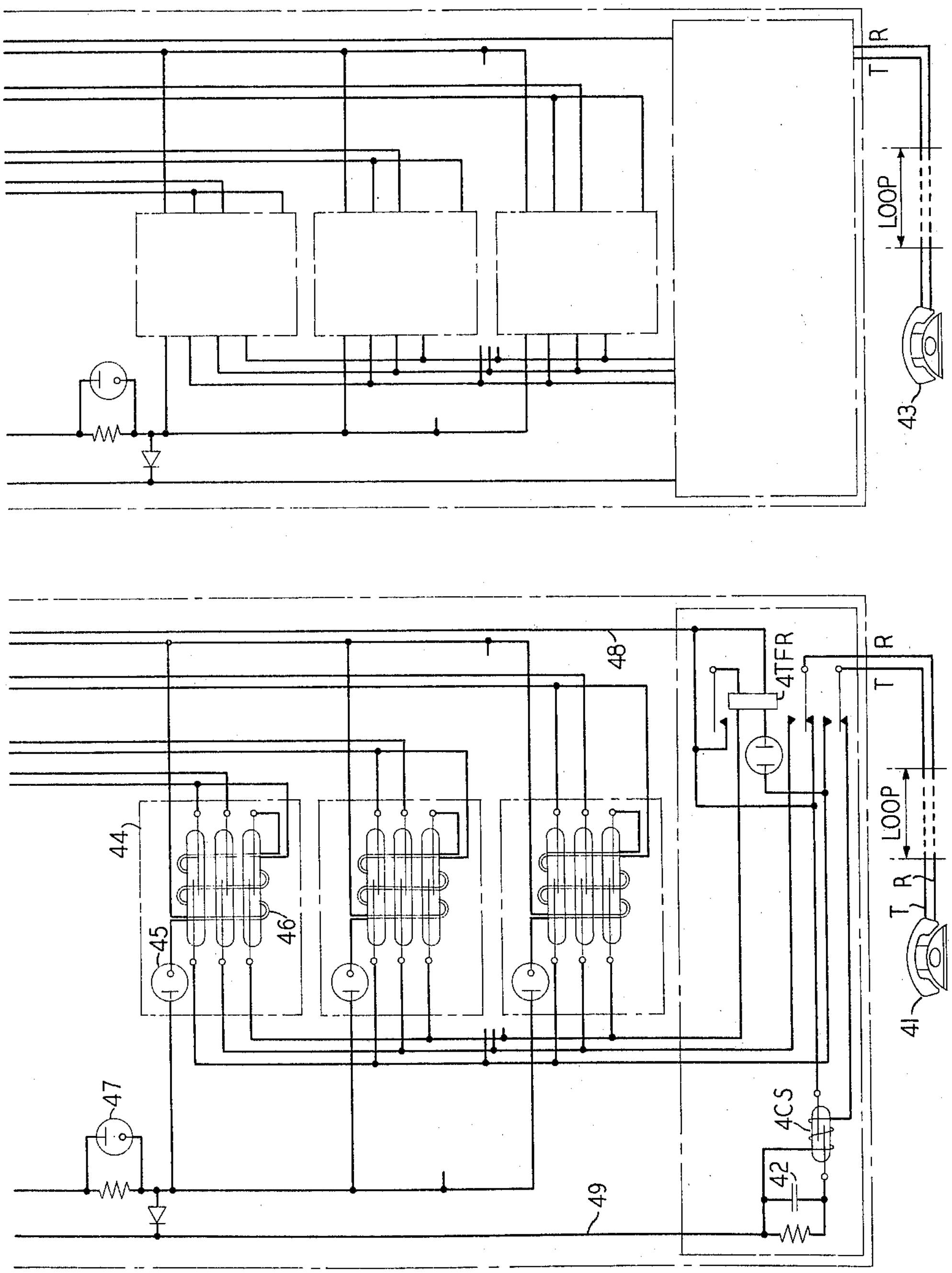
Figure 5:
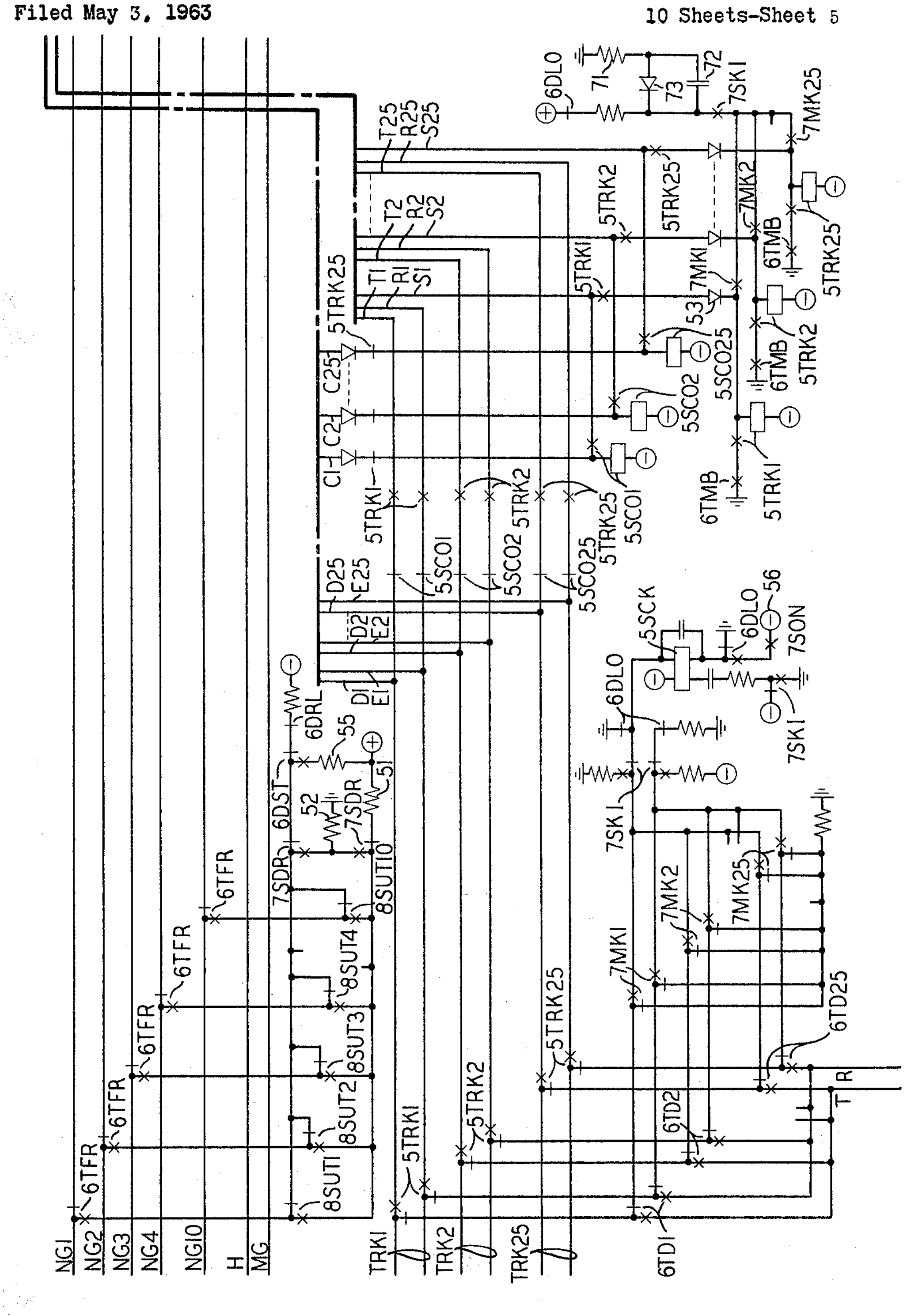
Figure 6:
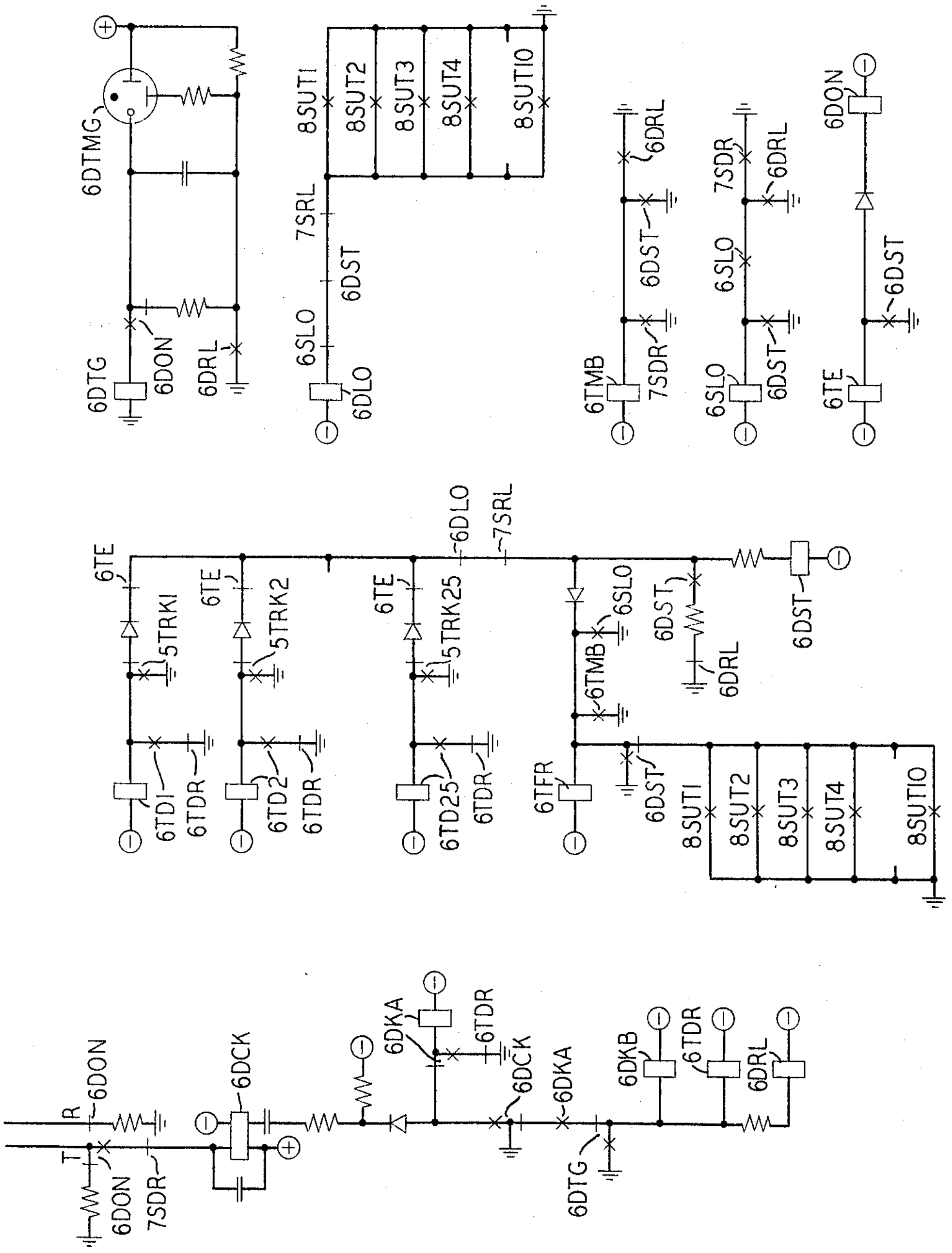
Figure 7:
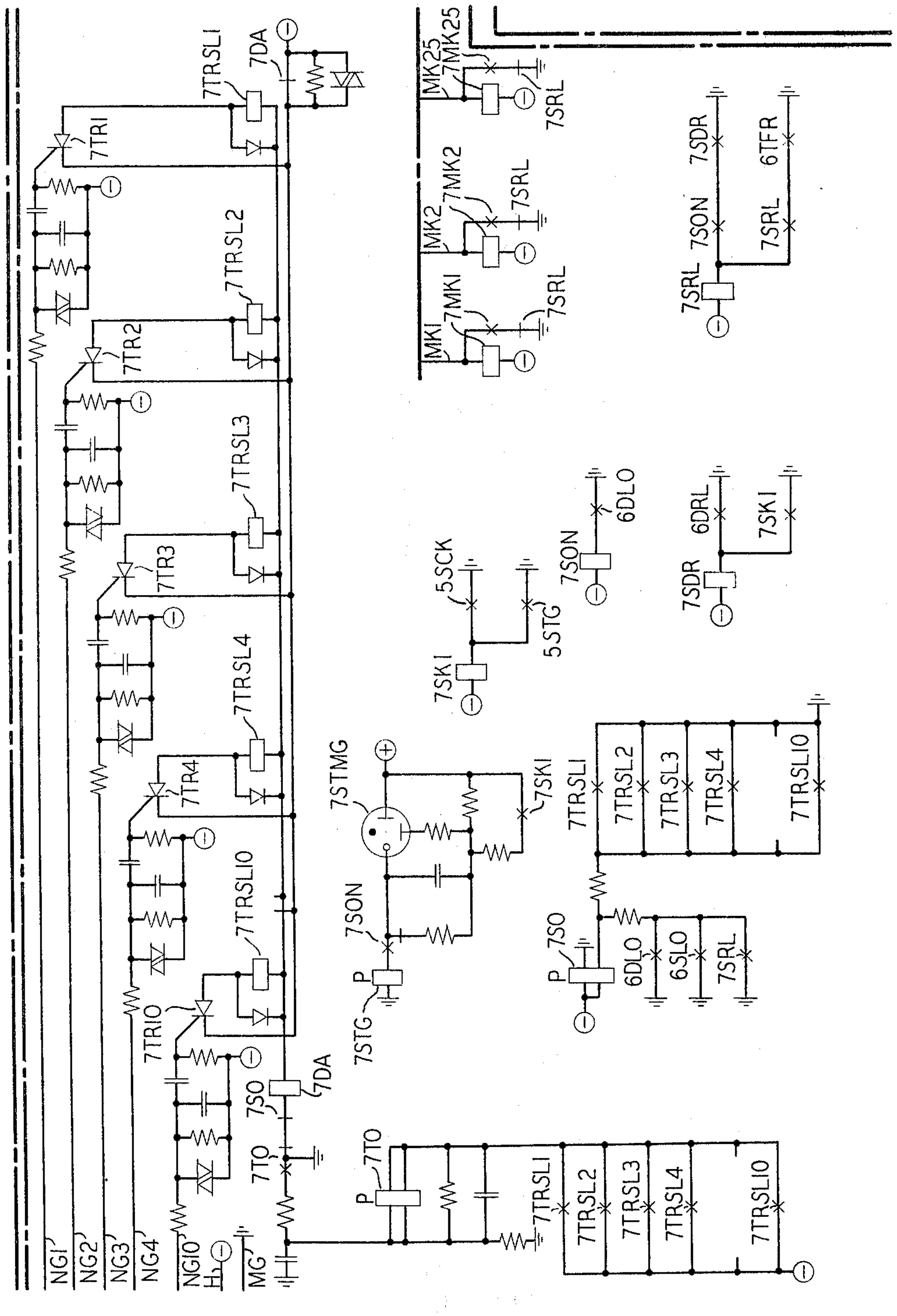

Operation of the respective relays 8SUT– results in the operation of relay 6TFR over an obvious path including the contacts of relay 6DST. Relay 6TFR, in operating, transfers the number group conductors NG– from the originating detector relays 7TRSL– to the marking circuitry preparatory to the application of marking potentials to the selected trunck and the number group conductors unique to the calling line to energize the crosspoints therebetween. Thus, a path may be traced in the case of conductor NG1 (FIG. 5) from positive battery at the central office, resistance 51, contacts of relay 7SDR, 8SUT1 and 6TFR to conductor NG1. Similar paths may be traced for conductors NG2, NG3, and NG4.

Figures 10, 11:
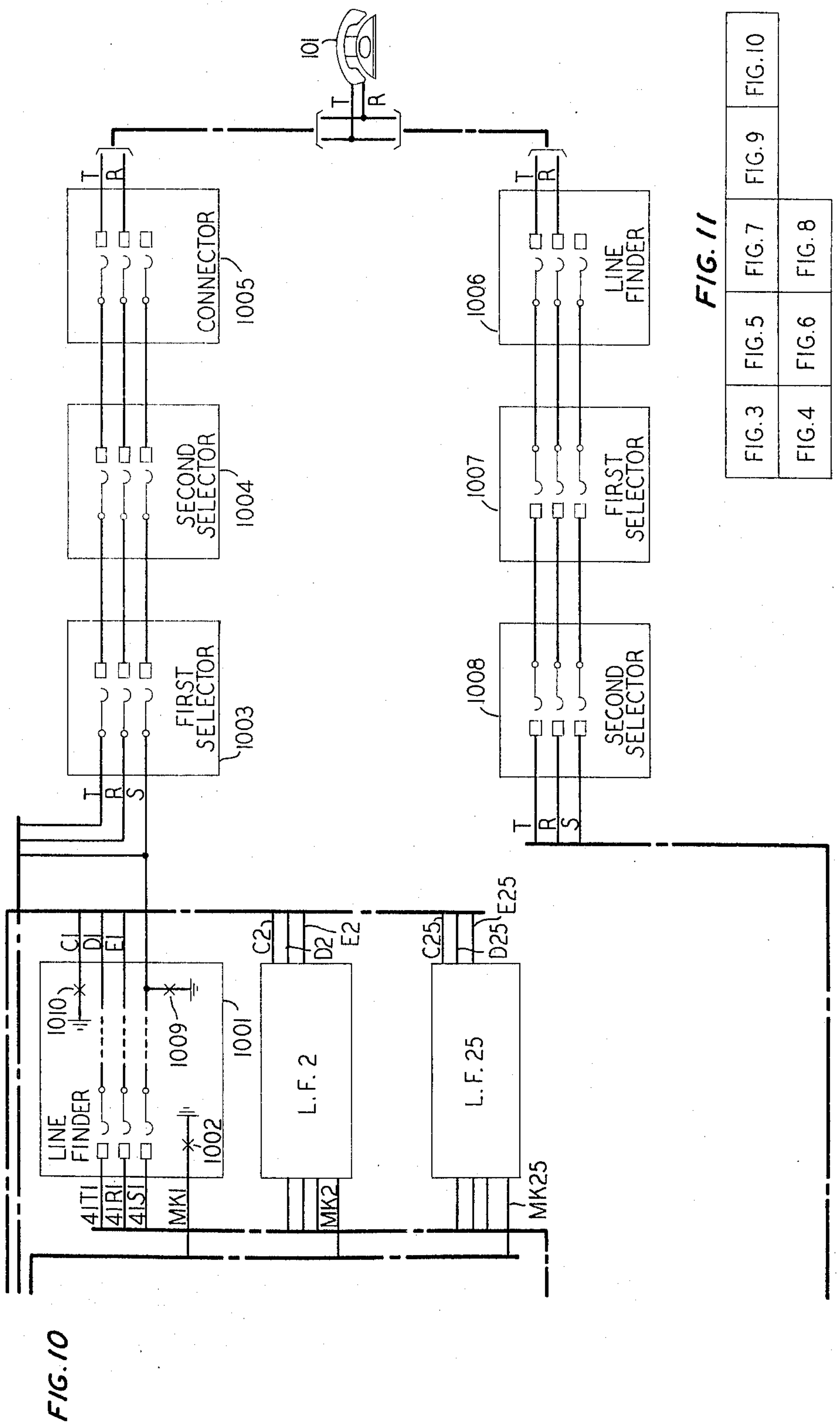

It will be noted that the operation of the line finder 1001 of FIG. 10 in selecting and seizing the line appearance of the calling line results in the operation of mark relay 7MK1 unique to the trunk corresponding to the line finder as shown symbolically by the operation of switch 1002. Operation of relay 7MK1 results in the application of a negative potential to the tip conductor of the selected trunk TK1 over a path (FIG. 5) from negative battery 56, contacts of relay 7SON, 6DLO, winding of relay 5SCK, contacts of relays 7SKI, 7MK1, 6TD4, 5TRK1 to the tip conductor of the trunk TK1.

It will be noted that relays 6DLO and 7SON are previously operated in consequence of the operation of relay 8SUT. Thus, relay 6DLO operated over a path from negative battery, winding of relay 6DLO, contacts of relays 6SLO, 6DST, 7SRL, 8SUT1–8SUT4 to ground. Relay 7SON operated at the contacts of relay 6DLO over an obvious path.

The marking potentials thus applied to the number group conductors and the trunk tip conductor result in the breakdown of gas tubes at the remote location unique to the calling subscriber's line to operate the crosspoints 44 thereat in the manner described in the above-referred-to applications and the applications referred to therein.

As a result of the energization of the trunk tube 45 and the crosspoint relay 46, current flows in the tip and ring conductor of trunk TK1 to operate relay 5SCK at the central office. Operation of relay 5SCK results in the operation of relay 7SK1 over an obvious path which in turn decreases the time required for tube 7STMG to fire, also as described in the above-referred-to application of C. E. Brooks and W. C. Sand. Firing of tube 7STMG results in the operation of relay 7STG over the contacts of relay 7SON. The operation of relay 7SK1 opens the marking potential on the tip conductor of the trunk. Moreover, the operated relay 7SK1 releases relay 5SCK.

Relay 7SDR operates at the contacts of relay 7SK1 and relay 5TRK1 operates over a path including ground, resistance 71, capacitor 72, contacts of relays 7SK1, 7MK1, winding of relay 5TRK1 to negative battery. When capacitor 72 discharges in this circuit, diode 73 becomes conducting to hold relay 5TRK1 operated. Operation of relay 5TRK1 results in the operation of relay 6TD1 over an obvious path.

Moreover, the operation of relay 7SDR results in the disconnection of the marking potential from the selected number group conductors NG1–NG4 and the application of ground potential to all of the number group conductors through resistance 52.

Operation of relay 7SDR results in the operation of relay 6TMB over an obvious path and relay 7SRL is operated over the contacts of relays 7SDR and 7SON.

Operation of relay 7SRL initiates the release of the common equipment in consequence of the opening of the contacts of relay 7SRL in series with the holding paths for the control relays in a sequence which includes the release of relays 8SUT1–8SUT4, relays 6DLO and 5MK1.

Release of relay 6DLO results in the release of relay 7SON which in turn releases relay 7STG. The release of relay 7STG opens the holding path for relay 7SK1 which in turn releases relay 7SDR. The latter relay releases relay 6TMB which in turn releases relay 6TFR. Relay 6TFR in releasing opens the holding path for the release relay 7SRL.

The common control equipment in the applique circuit has now restored to normal and relay 5TRK1 remains operated in consequence of the ground condition applied over diode 53, contacts of relay 5TRK1, sleeve S1, to the ground applied in the conventional manner to the sleeve appearance in the central office as shown symbolically by contacts 1006. Relay 6TD1 remains locked operated over the contacts of relay 6TDR.

At this time substation 41 is connected over the crosspoint contacts in the package 44 corresponding to substation 41 and trunk TK1 to the central office. The first selector 1003 in FIG. 10 associated with the line finder which has seized the line appearance unique to the concentrator line now supplies dial tone to the calling substation. Dial pulses thereafter transmitted by the calling subscriber representative of the called directory number are operative upon the step-by-step circuitry including second selector 1004 and connector 1005 in the conventional manner to extend a connection to the called line.

*Detailed description of disconnect operation*

When the conversation is completed and the subscriber at substation 41 replaces the receiver, appropriate supervisory equipment in the step-by-step office responsive to the decrease in direct current flow on the concentrator trunk, responds to remove the ground condition from the sleeve appearance in the central office unique to line 41 in the conventional manner. When the ground condition is removed from the sleeve conductor, relay 5TRK1 is released a path may be traced from ground to operate relay 6DST, the disconnect start relay over the contacts of relays 6TDR and 6TD1. Relay 6TFR is operated at the contacts of relay 6DST as are relays 6TMB, 6DON and 6TE. Operation of relay 6TFR transfers the number group conductors NG1–NG10 from the number group conductor circuit to the contacts of relays 8SUT1–8SUT10.

Operation of relay 6DST results in the application of a positive 70 volt potential over resistance 55, the contacts of relay 7SDR, 8SUT1–8SUT10 and 6TFR to the number group conductors.

Operation of relay 6DON results in the application of a positive potential of 150 volts to the tip conductor of the trunk over a path including the winding of relay 6DCK, contacts of relays 7SDR, 6DON, 6TD1 and 5TRK1 to the tip conductor of trunk TK1.

The application of these marking potentials to the number group conductors and to the tip conductor of the trunk to be disconnected results in the energization of a gas tube 47 at the line package unique to the calling substation line which in turn provides a path for the release of the crosspoint relay and the release of the transfer relay to restore the line conductors to the number group leads as explained in the above-referred-to application.

In consequence of the firing of the remote gas tube, relay 6DCK operates and in turn operates relay 6DKA.

When the crosspoints in the remote package release, relay 6DCK releases in consequence of the interruption of current flow therethrough. At this time relays 6DKB, 6TDR and 6DRL are operated over the contacts of relay 6DTG to initiate the release of the disconnect circuit. Relay 6DTG operated as a result of the operational relay 6DON after the time interval provided by the circuit including tube 6DTMG.

The operation of relay 6DRL results in the operation of relay 7SDR and cancels the operation of the timing circuit 6DTMG. Moreover, relay 6DST releases at the contacts of relay 6DRL and in turn releases relays 6DON and 6TE.

Operation of relay 6SDR removes the 70 volt marking potential from the number group conductors NG1–NG10. Relay 6TDR in operating results in the release of relays 6TD1 and 6DKA which in turn releases relays 6DKB, 6TDR and 6DRL. The latter relay releases relay 7SDR to complete the disconnect cycle.

*Detailed description of terminating call to concentrated line*

Figure 9:
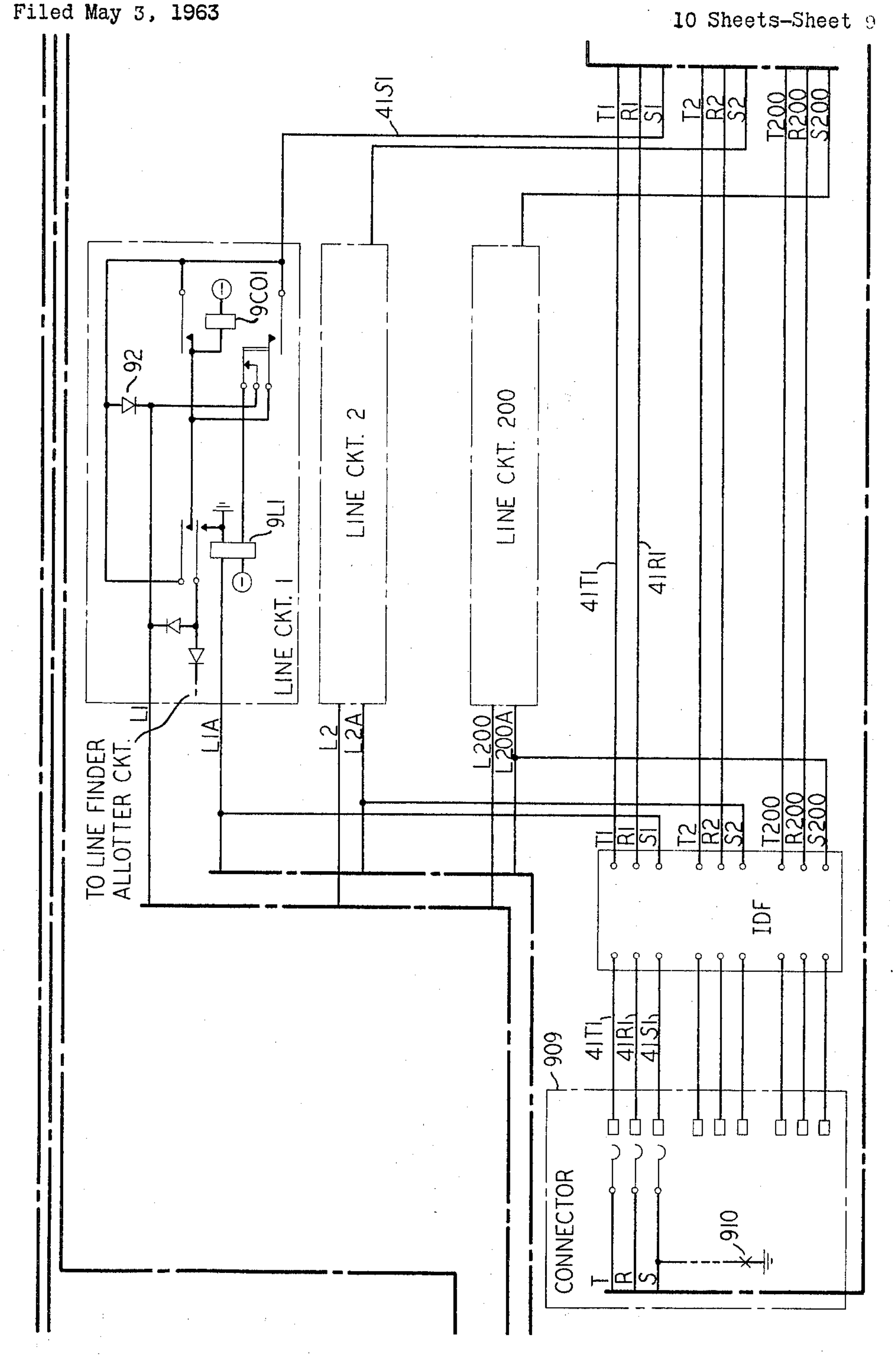

It will now be assumed that a calling subscriber at a distant office is initiating a terminating call to concentrator line 41. Thus, in FIG. 10 the subscriber at substation 101 in a step-by-step office removes the receiver from the cradle thereby closing the switchhook contacts (not shown) and energizing a line finder 1006 which hunts for the terminals of the calling substation 101. When the line finder seizes the terminals of the calling line, the first selector 1007 individual to the line finder provides dial tone to the calling subscriber and the dialing of the directory number of concentrator line 41 is begun. The office equipment responds in a routine manner on a "step-by-step" basis to each of the dialed digits to extend a connection over the first selector 1007, second selector 1008 and the connector 909 in the called office of FIG. 9 to the line appearance 41T, 41R, 41S unique to concentrator line 41, i.e., the appearance to which substation 41 would have been connected if directly connected to the office. When, in accordance with conventional practice, a ground condition is applied to the sleeve conductor of the line appearance of concentrator line 41 as shown symbolically by contacts 910, a path may be traced for the operation of the line relay 9L1. It is significant to observe that the line relay 9L1 unique to concentrator line 41 is now being operated on a terminating call to line 41 in contrast to the traditional mode of operation in which the line relay is operated only on an originating call from line 41.

Thus, a path may be traced from ground on the sleeves 41S, terminal S1 of the intermediate distributing frame IDF over conductor L1, contacts of relay 9CO1, lower winding of relay 9L1 to negative battery. Relay 9L1 operates as a result of the completion of this path and simulates to the line finder of FIG. 9 a calling condition on line 41 even though the call to line 41 is a terminating call.

The operation of relay 9L1 extends negative battery through the winding of relay 9CO1 and the upper contacts of relay 9L1 over conductor S1 to the line finder 1001 and terminal 41S. The line finder "hunts" for the battery thus applied to sleeve terminal 41S unique to line 41 in the traditional manner as though line 41 were initiating an originating call. On seizure of the terminals unique to line 41, a path may be traced for operating the cutoff relay from ground which is applied to the sleeve appearance of the line finder in the conventional manner (not shown), conductor 41S, lead S1 contacts of relay 9L1, winding of relay 9CO1 to negative battery. Relay 9CO1, in operating, releases relay 9L1 which was held operated over the contacts of relay 9CO1.

The seizure of the line appearance unique to line 41 by line finder 1001 after the line appearance of line 41 was seized by connector 909 completes a communication path from calling substation 101, selector 1007, selector 1008, connector 909 through the intermediate distributing frame IDF to line finder 1001. The latter is associated on a one-for-one basis with trunk TK1 extending to the called line 41. Thus, a path is available to the remote switching unit 44 at which line 41 is located. This path includes line finder 1001 although ordinarily the line finder is used only on an originating call. Although a path now extends to the remote switching unit unique to line 41, marking potentials must be applied to the number group conductors individual to substation 41 (NG1–NG4) and to the trunk 5TK1 associated with the line finder of FIG. 10.

It will be noted in this respect that as a result of the release of relay 9L1, a path for the E.M.F. of self-induction may be traced from ground, contacts of relay 9L1, diode 91, conductor L1A, cable J, conductor L1A, diodes 81–84 in parallel, gas tubes 85–88 in parallel, resistances 811–814 in parallel, contacts of relays 8SUT1–8SUT4 in parallel to the windings of relays 8SUT1–8SUT4 to ground. The latter relays represent, collectively, the "concentrator number" of the called line 41. Information is now available in the applique circuitry to identify the selected trunk 5TK1 and the calling line 41.

It will also be noted that the operation of the line finder of FIG. 10 in seizing the called line, as described above, results in the operation of a mark relay 7MK1 which is unique to trunk 5TK1 in the manner described above for an originating call.

Having established a selected trunk in consequence of the operation of relay 7MK1 and the specific called line in consequence of the operation of relays 8SUT1–8SUT4, the applique circuitry proceeds to apply marking potentials in the manner described hereinabove for an originating call.

As a result of the application of the marking potentials, the crosspoint contacts in the remote package 44 unique to substation 41 are operated to extend a path to the tip and ring conductors of trunk TK1 and to the tip and ring conductors of the called line.

For the reasons discussed above, it is desirable to divorce the first selector 1003 from the line finder 1001 on a terminating call. Since the tip conductor conventionally has a ground potential applied thereto when the connector cuts through the ringing connection, the line finder 1001 which seizes the called line terminal finds a ground potential applied to the tip conductor which may be extended over conductor C1 as shown symbolically by the operation of contacts 1010 to extend the ground to operate relay 5CO1 over the contacts of relay 5TRK1. Operation of relay 5CO1 divorces the conductors leading to the tip and ring of the first selector from the conductors leading to the tip and ring of the line finder.

The usual ringing potentials are applied to the called line and when the called party at substation 41 answers, conventional tripping equipment in the step-by-step office interrupts ringing and conversation may ensue.

When either party hangs up after the conversation is completed, the disconnect operation is similar to that described hereinabove for the disconnect operation on an originating call.

It is to be understood that the above-described arrangements are illustrative of the application of the principles of the invention. Numerous other arrangements may be devised by those skilled in the art without departing from the spirit and scope of the invention.

What is claimed is:

1. A remote telephone line concentrator system including a telephone central office, a plurality of trunks extending from said office, a plurality of remote substation lines, remote switching means for connecting said lines to said trunks under control of said office, a plurality of terminals in said office individual to said lines, line finder means and connector means at said office, and means at said office effective upon a terminating call to one of said lines for simultaneously coupling said line finder means and said connector means to said terminals individual to said line to extend a connection to said called line.

2. A telephone line concentrator system for use in combination with a step-by-step telephone central office comprising a plurality of remote substation lines, a lesser plurality of trunks extending from said office, remote switching means for connecting said lines to said trunks under control of said office, a plurality of terminals in said office individual to said lines, line finder means in said office individually connectable to said trunks, first selector means in said office connectable to said line finder means, means at said office effective upon an originating call to one of said lines for extending a connection from said line over a selected idle one of said trunks to said line finder means and said first selector means, and additional means in said office effective upon a terminating call to one of said lines for disconnecting said line finder means from said first selector means.

3. A telephone line concentrator switching system for use in combination with a step-by-step telephone office including a plurality of remote substation lines, a lesser plurality of trunks extending to said office, remote switching means for connecting said lines to said trunks under control of said office, line finder means in said office individually connectable to said trunks, first selector means in said office individually connectable to said line finders, connector means in said office, means in said office effective upon a terminating call to one of said lines for extending a connection over said connector means and said line finder means to a selected idle trunk to said one line, and additional means in said office for disconnecting said first selector means from said line finder means.

4. A telephone line concentrator system for use in combination with a step-by-step telephone central office including a plurality of remote substation lines, a lesser plurality of trunks extending from said office, remote switching means for connecting said lines to said trunks under control of said office, a plurality of terminals individual to said lines in said office, line finder means, connector means, first selector means, means effective upon an originating call at one of said substations for energizing said line finder means to seize said terminals individual to said calling line and for connecting said first selector means to said line finder means, means effective upon a terminating call to one of said lines for energizing said connector means to seize said terminals individual to said called line, and additional means responsive to the seizure of said terminals by said connector means for energizing said line finder means to seize said terminals individual to said called line and to disconnect said first selector means from said line finder means.

5. A remote telephone line concentrator system including a telephone central office, a plurality of concentrator trunks extending from said office, a plurality of remote substation lines, remote switching means for connecting said lines to said trunks under control of said office, a line relay individual to each of said lines in said office normally responsive to an originating call at one of said lines, and means in said office effective upon a terminating call to one of said lines for operating said line relay.

6. A telephone line concentrator system for use in combination with a step-by-step telephone central office comprising a plurality of remote substation lines, a lesser plurality of speech trunks extending from said office, remote switching means for connecting said lines to said trunks under control of said office, a plurality of terminals in said office individual to said lines, line finder means in said office, a plurality of line relays and cutoff relays individual to said line terminals, means at said office effective upon an originating call at one of said lines for operating said line relay individual to said one line and for extending a connection to said line over one of said trunks, additional means responsive to the operation of said line relay for operating said cutoff relay individual to said one line and for releasing said line relay, and means in said office effective upon a terminating call to one of said lines for extending a connection to said line terminal in said office individual to said called line and for operating said line relay individual to said called line to energize said line finder for extending a connection to said called line.

7. A telephone line concentrator system including a telephone central office, a plurality of remote substation lines, a lesser plurality of concentrator trunks extending from said office, remote switching means for connecting said lines to said trunks under control of said office, line finder means in said office individual to said trunks, first selector means individually connectable to said line finder means, and means in said office effective upon a terminating call to one of said lines for extending a connection to said called line over said line finder means including means for disconnecting said line finder means from said first selector means.

8. A telephone line concentrator system including a plurality of remote substation lines, a telephone central office, a plurality of speech trunks less in number than said lines extending from said office, remote switching means, a plurality of line terminals in said office individual to said lines, line finder means in said office individually connectable to said trunks, line relay means in said office individual to said line terminals, means in said office effective upon an originating call at one of said substations for operating said line relay means to energize said line finder for extending a connection from said line appearance in said office individual to said calling line and over a selected trunk coupled to said line finder to said calling line, and additional means in said office responsive to the operation of said line relay means and the energization of said line finder for applying marking potentials to said trunks to operate said remote switching means for coupling said remote substation line to said selected trunk.

9. A telephone line concentrator system including a telephone central office, a plurality of trunks extending from said office, a plurality of remote substation lines, remote switching means for connecting said lines to said trunks under control of said office, a plurality of terminals in said office individual to said lines, line finder means individual to said trunks, connector means in said office, means in said office effective upon a terminating call to one of said lines for extending a call to said line terminal individual to said line and for energizing said line finder to extend a connection over said connector means and said line finder means to a selected trunk extending to said remote switching means, and means in said office responsive to the energization of said line finder means for applying marking potentials to said selected trunk to operate said remote switching means for connecting said remote substation line to said selected trunk.

10. A remote telephone line concentrator system for use in combination with step-by-step telephone central offices comprising a plurality of remote substation lines, a smaller plurality of speech trunks extending from said office, remote switching means for connecting said lines to said trunks under control of said office, line finder means in said office, first selector means in said office, a plurality of line terminals in said office individual to said remote substation lines, means in said office effective in response to an originating call at one of said remote lines for energizing said line finder to seize said terminals individual to said line, and additional means in said office for extending a speech connection to said calling line from said first selector means over one of said trunks in bypass of said line finder means.

11. A remote telephone line concentrator system for use in combination with a step-by-step telephone central office comprising a plurality of remote substation lines, a smaller plurality of speech trunks extending from said office, remote switching means for connecting said lines to said trunks under control of said office, line finder means in said office, and means in said office effective upon a terminating call to one of said lines for extending a speech connection through said line finder means and over one of said trunks to said called substation line.

12. A telephone line concentrator system for use in combination with a step-by-step telephone central office comprising a plurality of remote substation lines, a lesser plurality of trunks extending from said office, remote switching means for connecting said lines to said trunks under control of said office, line finder means in said office, means in said office effective upon an originating call from one of said remote lines for energizing said line finder means to select a trunk to said calling line, and additional means in said office effective upon a terminating call to one of said remote lines for simulating to said line finder means an originating call on said line to select a trunk to said called line.

13. A telephone line concentrator system for use in a step-by-step telephone central office comprising a plurality of remote substation lines, a smaller plurality of trunks extending from said office, remote switching means for connecting said lines to said trunks under control of said office, a plurality of terminals in said office individual to said lines, line finder means in said office normally operative in response to originating calls from said lines for hunting for said terminals individual to said calling lines, and means in said office effective upon a terminating call to one of said lines for energizing said line finder means to hunt for said terminals of said called line.

14. A telephone line concentrator system comprising a telephone central office, a plurality of remote substation lines, a smaller plurality of trunks extending from said office, remote switching means for connecting said lines to said trunks under control of said office, a plurality of terminals in said office individual to said lines, switching means in said office normally effective to provide a concentrating stage between said terminals and said office, and means in said office for energizing said switching means as a deconcentrating stage between said terminals and said trunks.

15. A telephone line concentrator system for use in combination with a step-by-step telephone central office comprising a plurality of remote substation lines, a smaller plurality of trunks extending from said office, remote switching means for connecting said lines to said trunks under control of said office, a plurality of terminals in said office individual to said lines, line finder means in said office, selector means in said office, connector means in said office, means in said office effective upon an originating call at one of said remote substation lines for marking said line terminals individual to said calling line, additional means for energizing said line finder means to hunt for said marked terminals, means for thereafter extending a connection to said calling line from said office over a path including said selector means and one of said trunks individual to said line finder means, means in said office effective upon a terminating call to one of said remote substation lines for energizing said line terminals individual to said called line and actuating said line finder means to hunt for said called line terminals, and further means in said office for thereafter extending a connection from said office to said called line over a path including said connector means and line finder means and a selected trunk, said further means including means for electrically divorcing said line finder means from said selector means.

References Cited by the Examiner

UNITED STATES PATENTS 2,402,446 6/1946 Powell ............ 179—18.3

KATHLEEN H. CLAFFY, *Primary Examiner.*

L. A. WRIGHT, *Assistant Examiner.*